United States Patent [19]

Grahl

[11] Patent Number: 5,697,286
[45] Date of Patent: Dec. 16, 1997

[54] FLUID PRESSURE UNIT WITH BRAKE MEANS

[75] Inventor: Thomas Grahl, Neumunster, Germany

[73] Assignee: Sauer Inc., Ames, Iowa

[21] Appl. No.: 421,768

[22] Filed: Apr. 14, 1995

Related U.S. Application Data

[63] Continuation of Ser. No. 225,603, Apr. 11, 1994, Pat. No. 5,439,356.

[30] Foreign Application Priority Data

Apr. 13, 1993 [DE] Germany ............ 43 11 997.2

[51] Int. Cl.⁶ ............................................ F15B 16/26
[52] U.S. Cl. ................. 92/24; 92/28; 92/63; 188/170
[58] Field of Search ............................ 92/24, 28, 63; 188/120, 72.3

[56] References Cited

U.S. PATENT DOCUMENTS

| | | | |
|---|---|---|---|
| 2,893,519 | 7/1959 | Martin | 92/28 |
| 3,155,010 | 11/1964 | Johnson et al. | 91/485 |
| 3,796,136 | 3/1974 | Oguni | 91/485 |
| 3,946,837 | 3/1976 | Houser | 92/63 |
| 3,956,972 | 5/1976 | Clerk | 91/485 |
| 4,700,613 | 10/1987 | Tiljander . | |
| 4,724,742 | 2/1988 | Bigo et al. | 91/491 |
| 5,114,324 | 5/1992 | Spindeldreher | 188/170 |
| 5,115,890 | 5/1992 | Noel | 188/170 |
| 5,333,705 | 8/1994 | Lemaire et al. | 188/170 |

*Primary Examiner*—Charles G. Freay
*Attorney, Agent, or Firm*—Zarley, McKee, Thomte, Voorhees & Sease

[57] ABSTRACT

A motor or pump includes a stator and a rotor supported for rotation with respect to the stator by a bearing arrangement. The rotor has a cylinder block thereon having radial cylinder bores equipped with radially reciprocable pistons. Rollers on the pistons abut a cam ring fixed to the stator so that the pistons to reciprocate radially to displace fluid when the rotor turns relative to the stator. The stator includes a control device fixed thereon having a pair of fluid passages therein. One side of the control device constitutes a distribution face with outlets therein connecting the fluid passages to the cylinder bores as the rotor rotates. A counterpart fastens to the rotor adjacent the opposite side of the control device so as to define an annular chamber therebetween. A shuttle valve operatively interposed between the passages and chamber ensures that the chamber remains in connection with the passage having the higher pressure. As a result, the pressure in the annular chamber automatically compensates for the hydraulic separating forces generated between the cylinder block and the control device distribution face. With or without such separating force compensation, such a fluid pressure unit can be equipped with a disc brake secured to the rotor by a sleeve, particularly a sleeve having a conical-shaped central opening.

1 Claim, 2 Drawing Sheets

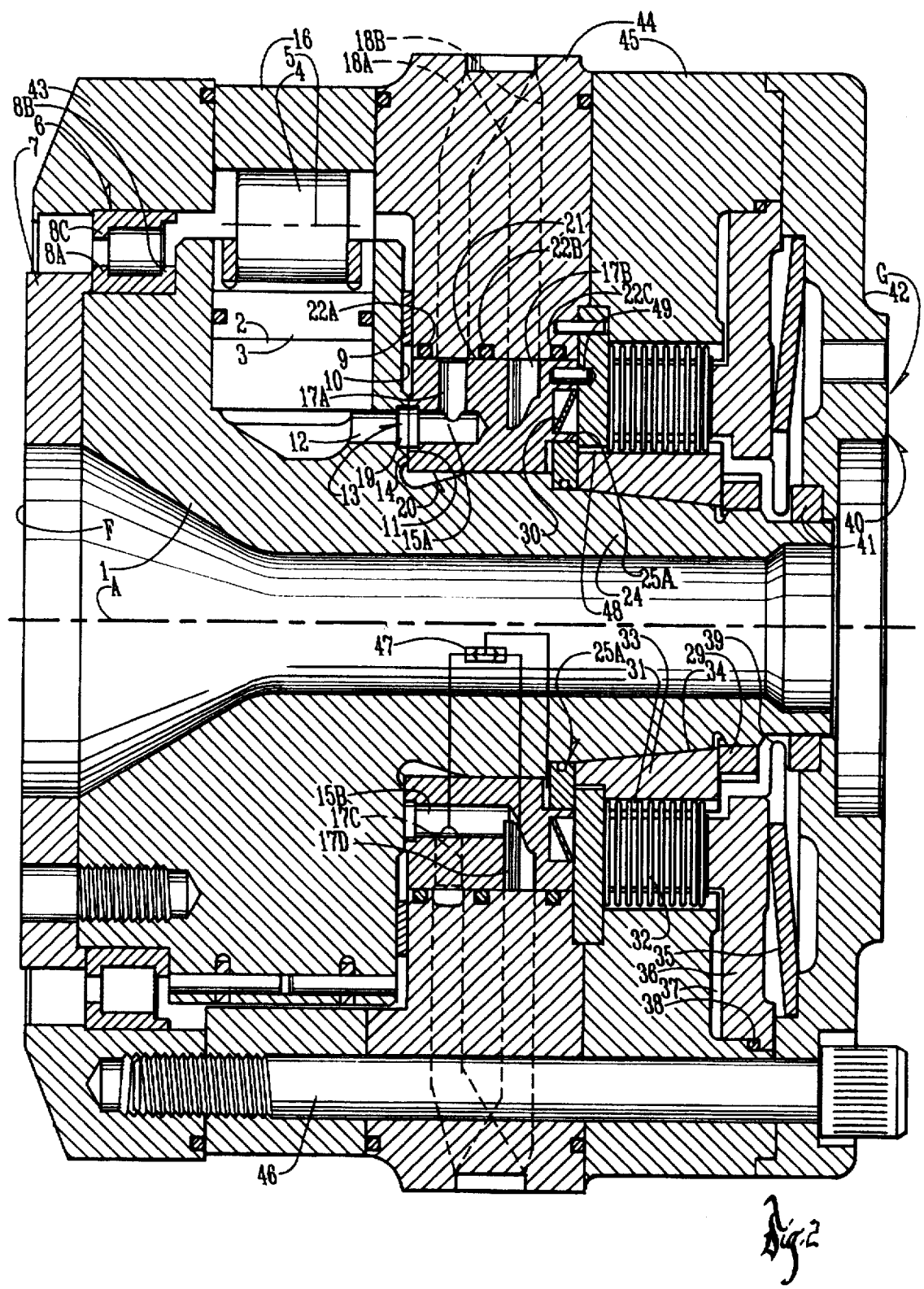

FLUID PRESSURE UNIT WITH BRAKE MEANS

This is a continuation of application Ser. No. 08/225,603 filed on Apr. 11, 1994, now U.S. Pat. No. 5,439,356.

BACKGROUND OF THE INVENTION

The present invention relates to the field of fluid pressure units, in particular a hydraulic motor or hydraulic pump, comprising rotating and stationary elements such as a rotor and a stator and a support of the rotor with respect to the stator, where those elements are arranged to allow rotational motion around a geometrical axis and are fixed to each other in the direction of this axis, a cam ring which is fastened to the stator, a cylinder block as a part of the rotor in which cylinder bores are made and disposed substantially in a radial direction and slidable pistons mounted in said cylinders which are abutted on the cam rings by rollers.

Such radial piston fluid pressure units are known from DE 3834878 A1, for example. These known pump and motor mechanisms are subjects of continuous research with the intention of reducing their space requirements in radial and axial directions. The axial space requirement of the mechanism is substantially affected by the bearing arrangement. So the primary activities have been concentrated in this area and several configurations of bearing arrangement have been established. It is essential to ensure support in both axial and radial directions. The radial load component results mainly from external forces acting on the mechanism, while axial load components may also be created from internal system dependent forces.

It is an object of the invention to propose a novel system configuration in which this internal axial force component is considerably reduced and which enables the use of a smaller dimensioned bearing arrangement thus leading to a lower requirement of axial and radial space.

It is a further object of the invention to permit the axial force component acting on the bearing arrangement to result from the known assembly of the control device which controls the flow connection of the cylinders to both of the pressure ports of the mechanism.

SUMMARY OF THE INVENTION

The hydrostatic motor of this invention includes a cylinder block having several cylinder bores which are disposed radially inside of this block. On one end, close to the geometrical axis each of those cylinders is connected to corresponding bores extending substantially axially such that the centers of the outlets of all bores are disposed on the same pitch diameter on the front face of the block cylinder. On this front face the distribution face of the cylinder block is provided containing said outlets.

In a similar way, the distribution face of the control device connected to the stator is established. Here however, the number of bores is twice the number of the lobes of the cam ring. Inside of the tube shaped control device said bores are arranged substantially in an axial direction. On the side opposite to the distribution face the bores discharge alternately into annular grooves which are tooled into the control device at its exterior side and which are connected to the pressure ports of the fluid pressure unit.

The distribution faces of both the rotating cylinder block and the stationary control device are abutting on each other. If the mechanism is pressurized, a hydrostatic separating force is created tending to separate the cylinder block from the control device. In order to maintain the control device in contact to the cylinder block a hydraulic force is generated in known mechanisms acting against said separating force and therefore holding the control device in contact with the cylinder block. In known mechanisms the hydraulic force is generated so that the outer diameter of the control device is tooled stepwise at each location of said annular grooves. The steps are dimensioned in a way that the sum of all forces, here called compensating force, given by the product of the effective ring areas, which are characterized by the diameters of corresponding steps, and the pressure force inside of the annular grooves is nearly the same as the separating force acting between the cylinder block and the control device. The ratio that the separating force bears to the compensating force is not specified exactly, because the compensating force may be increased by mechanical forces, e.g. spring forces, and therefore must not necessarily exceed the separating force.

In known mechanisms with rotating cylinder block the compensating force resulting from the stepped diameters of the control device generates a reaction force acting on the stator of the fluid pressure unit. The same force acting in the opposite direction has to be carried by the bearings supporting the rotor with respect to the stator.

The advantage resulting from the special arrangements according to the present invention lies in the fact that the stepped diameters of the control device are not located at its outer side but at its inner side such that said reaction force is acting on a counterpart which is shaped to fit to the steps and which is rotatory and axially fixed to the rotor. Therefore, the reaction force usually acting on the bearing arrangement can be alleviated because the force is completely transmitted inside of the rotor.

The sealing between the control device fixed to the stator and the counterpart fixed to the rotor is realized by metallic or non metallic sealings.

The invention also includes mechanisms having switchable displacements, which are equipped with control devices having more than two annular grooves.

BRIEF DESCRIPTION OF THE DRAWINGS

FIG. 2 is a sectional view similar to that of FIG. 1, but shows a modified form of the invention.

DESCRIPTION OF THE PREFERRED EMBODIMENT

Figure 1:
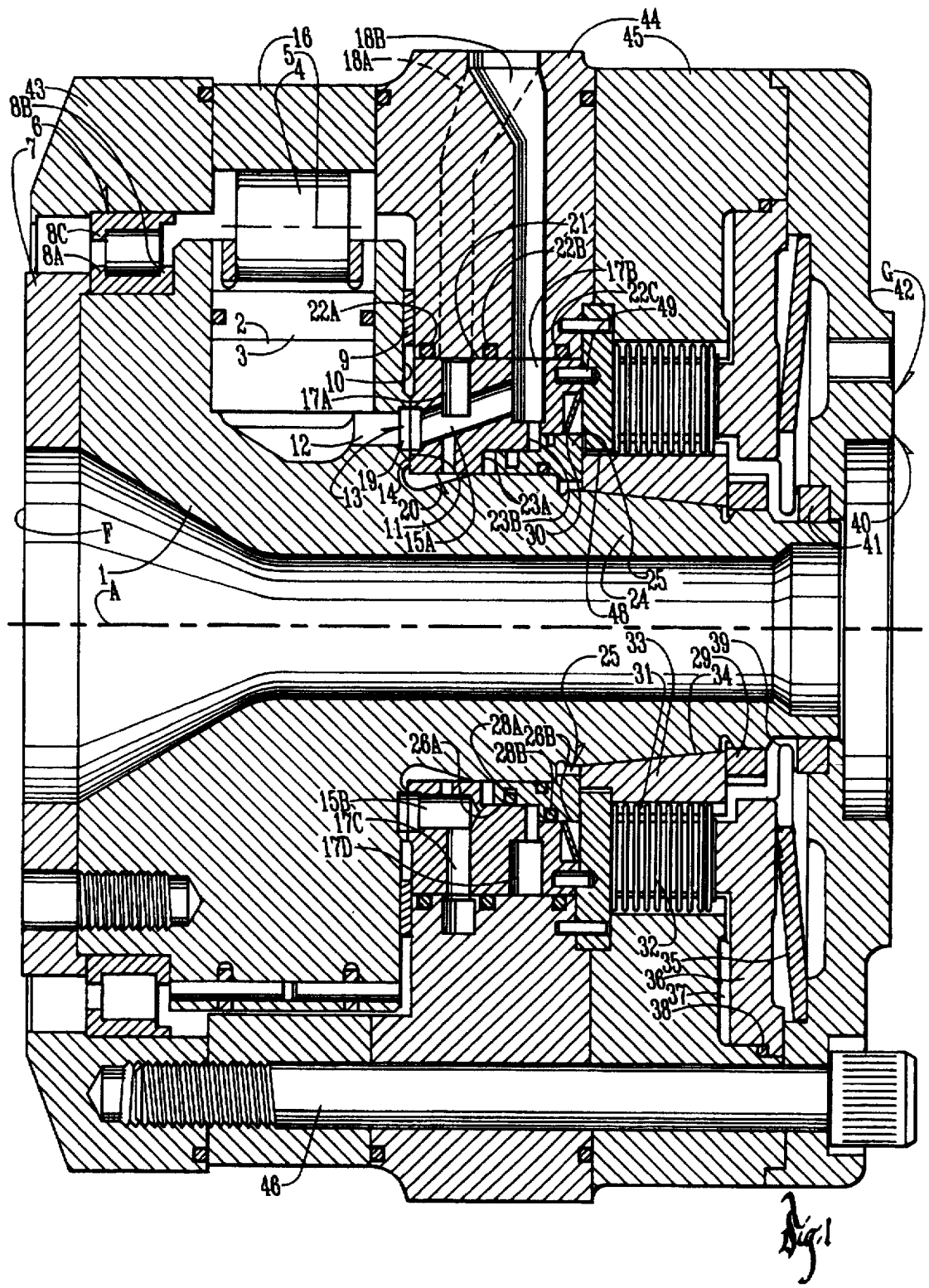
FIG. 1 is a sectional view taken through the device of this invention.

The hydraulic motor shown in the figures substantially comprises:

- a housing including three parts 43, 44, 45, assembled by screws 46 with sealings interposed between them, generally referred to hereinafter as a stator,
- a cam ring 16,
- a cylinder block 1, generally referred to hereinafter as a rotor, which is directly located in the housing by bearings 6 and 48 and which has rotational freedom around a geometrical axis of rotation A,
- a control device 20 with a corresponding counterpart 25 on the rotor,
- a park brake with an annular brake piston 36 and a belleville spring washer 35, and a cover 40.

The cylinder block 1 is provided with radial cylinder bores 2, which are regularly spaced apart angularly. Each cylinder bore 2 contains a slidable piston 3. The ends of the pistons that are orientated toward the outer periphery with respect to the geometrical axis A of the mechanisms are provided with rollers 4 having an axis 5 orientated parallel to the geometrical axis.

One end of the cylinder block is equipped with an extension for a roller bearing 6. The inner race of the bearing is mounted to the extension of the cylinder block by means of a retaining flange 7. The rolling members of said roller bearing 6 are axially fixed with respect to the geometrical axis A by the shoulders 8a, b of the inner bearing race. An outer race axial hold 8c is only provided in one direction so that the cylinder block 1 cannot be removed to the flange side F; the corresponding fixation required for the other direction is arranged on the opposite end of said extension of the cylinder block 1 and consists of a sliding ring 9, preferably made of a non metallic material, which is fixed to the stator and runs against a planar face 10 of the cylinder block 1. A bearing 48 may be provided as an additional support.

On the opposite side of said extension of the cylinder block 1 the distribution face 11 of the cylinder block 1 is arranged. Preferably, the distribution face 11 is a planar surface perpendicular to the geometrical axis A.

The cylinder bores 2 described before are connected to the said distribution face 11 by bores 12, wherein a bore 12 for each cylinder bore 2 is provided and the bores are discharging in outlets 13, which are disposed on distribution surface 11 and regularly spaced around a circle centered on the geometrical axis.

The distribution face 14 of the distributor 20 is adapted to abut with the planar distribution face 11 of the cylinder block 1 and is designed in a similar way. Inside of the distributor 20 bores 15a, b extend approximately parallel to the geometrical axis A of the machine. The number of bores 15a, b depends on the number of lobes provided on the periphery of the cam ring 16. Two bores 15a, b are provided for each lobe.

On the outer side of the distributor 20 grooves 17a, b are provided, which are connected to the ports of the mechanism by bores 18a, b which are arranged in the stator. Inside of the distributor 20 said two bores 15a, b corresponding to each lobe are arranged in a way that, on the one hand they discharge into outlets 19 on the planar face 14 and on the other hand they are connected to the annular grooves 17a, b of the distributor 20, wherein one of said bores 15a is connected to one first groove 17a, the other of said bores 15b is connected to the second annular groove 17b. Both annular grooves are provided on a cylindrical surface 21, which is centered about the geometrical axis A and arranged inside of a corresponding seat of the stator. The grooves 17a, b are isolated by sealings 22a, b, c which are provided between stator and distributor 20. The distributor 20 is axially movable with respect to the stator, but rotation with respect to the geometrical axis A is prevented by means of a centering pin 49 which is fixed to the stator. On the inner diameter of the approximately tube shaped distributor two steps spaced apart from each other are arranged so that two separate annular areas 23a, b having different diameters are created.

On the side of the opposite flange G the cylinder block has a tubular extension 24 passing through the inner diameter of the tube shaped distributor 20. On this extension 24 a ring 25 stepped on its outer diameter is arranged. The ring 25 is rotating with the block cylinder and is equipped with two steps 26a, b on its outer diameter, both of them corresponding to said diameters of the inner side of the distributor 20. The ring 25 is mounted inside of the distributor 20 thus forming two ring chambers. Both ring chambers are isolated from each other by sealings 28a, b and are connected to the bores 18a, b being arranged inside of the distributor 20 which pairly correspond to each lobe of the cam ring 16. The paired bores are connected to the outer annular grooves of the distributor 20, so the ring chambers formed by the rotating ring 25 and the distributor 20 are in contact with the pressure ports of the motor, which are conveying a fluid of relatively high pressure and a fluid of relatively low pressure respectively when the machine is operating.

This pressure acts on the annular areas of the distributor 20 thus generating a force which tends to push the distributor 20 to the distribution face 11 of the cylinder block 1. The size of the annular areas, and therefore the magnitude of the resulting force, is designed such that the hydrostatic separating force acting between the distribution faces of the cylinder block 1 and the distributor 20 is compensated for. The compensation is such that the hydrostatic separate force is neutralized to the level required to prevent the lifting of the distributor 20 from the cylinder block. The reaction force acting on the stepped ring 25 is supported by a shaft nut 29. Additionally, the distributor 20 is normally engaged with the cylinder block 1 by means of a spring 30 abutting on the stator. Therefore, the cylinder block 1 and the distributor 20 are maintained in contact with each other, even if no fluid pressure is applied.

The advantage of the arrangement described above is that all reaction forces resulting from the known way of compensation are just acting within the rotor. In common designs known in the art this force is transmitted from the rotor to the stator, so it has to be supported by the bearing arrangement. Because of the magnitude of the fluid pressure the forces resulting therefrom are not negligible with respect to outside forces acting on the rotor. Therefore, an adequately sized bearing has to be provided. In designs according to this invention a smaller sized bearing arrangement can be used. Thus, the present invention leads to advantages in costs and space requirements.

A modified form of this invention (FIG. 2) is obtained when the stepped ring 25 is replaced by a non stepped ring 25a. In that embodiment only one ring chamber is forced between the distributor 20 and the ring 25a. This chamber is connected to the bores 17c, d by a shuttle valve 42. The shuttle valve 42 always provides that the highest of the pressures inside of the bores 17c, d acts on the ring chamber formed by the ring 25a and the distributor 20 and that the resulting force compensates the separating force acting between the distribution faces of distributor and cylinder block.

The invention is not limited to the embodiment described but covers, on the contrary, all the variants which may be made thereto without departing from the scope nor spirit thereof. This refers in particular to mechanisms having a switchable displacement. The distributors of those mechanisms are equipped with more than two annular grooves, the compensation of forces described before however is also applicable in an analogous way.

Additionally, a multiple disk brake is on the side of the rear flange G of the mechanism, wherein the splines 31 of the disks 32 are connected to the rotor by a sleeve 33 having a conical inner periphery 34, which is pressed to or frictionally engaged with a mating surface on the rotor by a shaft nut 29. If the brake is not pressurized, the belleville spring washer 35 is pressing the annular brake piston 36 to the brake disks 32, so the brake is activated. If the brake chamber 37 of the brake is pressurized by the brake release pressure, the annular brake piston 36 is pushed back toward the rear flange G of the mechanism thereby acting against the force of the belleville spring washer 35, so the brake is deactivated or released. The annular brake piston 36 is sealed at its outer diameter by an O-ring 38 and at its inner diameter by a metallic or non-metallic membrane 39, which is fixed to the inner diameter of the membrane 39 and which is fastened to the cover 40 at the rear flange side of the mechanism. A known shaft seal 41 is provided inside of the cover 40 to seal block the tube shape extension of the cylinder block 1 against membrane 39 and the cover 40.

The membrane 39 is sufficiently flexible that it can follow the movements of the annular brake piston 36. Therefore, the shaft seal 41 which provides the primary sealing is not forced to move on the rotor.

On the side of the rear flange the mechanism is obturated by a cover 40. This cover 40 is provided with a standardized pad 42 which is appropriate for assembling fluid pressure units to it. Furthermore, the cylinder block is designed to have a completely hollow center running along its geometrical axis.

The motor is operated in the known way. That is, if the pressure level of fluid passing through bore 17a is higher than the pressure level of a fluid in bore 17b the cylinder block 1 rotates in a first direction with respect to the stator. If the pressure allocation in the bores is reversed, the cylinder block turns in a second, opposite direction of rotation.

I claim:

1. A fluid pressure unit, comprising:

a stationary element having a cavity therein;

a rotating element disposed in the cavity and juxtapositioned with the stationary element; and a brake having a plurality of brake discs, the brake discs being secured for rotation with the rotating element by a sleeve;

the sleeve having a conical inner periphery for frictionally engaging a mating surface on the rotating element.

* * * * *